US012794510B2

(12) United States Patent
Carsello et al.

(10) Patent No.: US 12,794,510 B2
(45) Date of Patent: Nov. 10, 2026

(54) SMART SIGNAL ROUTING OF IEEE 802.11 DSSS AND OFDM SIGNALS

(71) Applicant: SR Technologies, Inc., Sunrise, FL (US)

(72) Inventors: Stephen R. Carsello, Plantation, FL (US); Conrad C. Smith, Parkland, FL (US); Nikolaos Glantzis, Coconut Creek, FL (US)

(73) Assignee: SR TECHNOLOGIES, INC., Sunrise, FL (US)

( * ) Notice: Subject to any disclaimer, the term of this patent is extended or adjusted under 35 U.S.C. 154(b) by 30 days.

(21) Appl. No.: 18/739,581

(22) Filed: Jun. 11, 2024

(65) Prior Publication Data

US 2025/0125834 A1 Apr. 17, 2025

Related U.S. Application Data

(60) Provisional application No. 63/590,670, filed on Oct. 16, 2023.

(51) Int. Cl.
*H04B 1/7163* (2011.01)
*H04B 1/7183* (2011.01)

(52) U.S. Cl.
CPC ....... *H04B 1/71632* (2013.01); *H04B 1/7183* (2013.01)

(58) Field of Classification Search
CPC .............. H04B 1/71632; H04B 1/7183; H04B 2201/7071; H04B 2201/70711; H04B 1/709; H04B 1/7073; H04L 5/0007; H04L 27/2602; H04L 27/261; H04L 27/2647
See application file for complete search history.

(56) References Cited

U.S. PATENT DOCUMENTS 5,537,435 A * 7/1996 Carney ................ H04B 1/0014 375/219
2008/0130604 A1* 6/2008 Boyd ...................... G01S 5/021 342/463
2020/0132829 A1* 4/2020 Jiang ....................... H04W 4/40

OTHER PUBLICATIONS

J. Cherkaoui and V. Glavac, "Signal frequency channelizer/ synthesizer," 2008 10th International Workshop on Signal Processing for Space Communications, Rhodes, Greece, 2008, pp. 1-4 (Year: 2008).*

* cited by examiner

*Primary Examiner* — Sam K Ahn
*Assistant Examiner* — Amneet Singh
(74) *Attorney, Agent, or Firm* — Goodwin Procter LLP

(57) ABSTRACT

A method is disclosed for a wideband Wi-Fi network analyzer that detects the presence of packets corresponding to a desired waveform type, and routing detected signals to a bank of demodulator resources, i.e., channel processors, based on availability and need. Furthermore, to mitigate the case of Wi-Fi 802.11b where the DSSS preamble is subject to false detection on neighboring channels, a neighbor channel filter, NCF, is also disclosed.

18 Claims, 9 Drawing Sheets

SMART SIGNAL ROUTER WITH TDM - OFDM

SMART SIGNAL ROUTING OF IEEE 802.11 DSSS AND OFDM SIGNALS

CROSS-REFERENCE TO RELATED APPLICATION

This application is related to and claims priority to U.S. Provisional Patent Application Ser. No. 63/590,670, filed Oct. 16, 2023, entitled SMART SIGNAL ROUTING OF IEEE 802.11 DSSS AND OFDM SIGNALS, the entirety of which is incorporated herein by reference.

TECHNICAL FIELD

The present disclosure relates to a method for detecting and demodulating signals from wireless local area network (WLAN) devices.

BACKGROUND

Initially, it is noted that Institute of Electrical and Electronics Engineers (IEEE) Standard 802.11—2020 is used as the base reference for disclosures used herein, the entire contents of which are incorporated herein by reference. The IEEE 802.11—2020 Standard is commonly referred to as "Wi-Fi" and is referred to as such herein. Wi-Fi signals may be transmitted on numerous channels within several bands. For example, in the 2.4 GHz band there are 14 available channels, and in the 5 GHz band there are generally 24 available channels (channels 32 to 144 omitting the U-NII-2B bank). Wi-Fi signals may also have different physical layer parameters. Devices compliant with Clauses 15 and 16 of the Standard, commonly referred to as '802.11b' devices, use a direct sequence spread spectrum (DSSS) preamble and devices compliant with Clause 18, commonly referred to as '802.11g' devices, use orthogonal frequency division multiplexing (OFDM). Both 802.11b and 802.11g devices are present in the 2.4 GHz band. Devices compliant with Clause 17 of the Standard, commonly referred to as '802.11a' devices, operate in the 5 GHz band where, for backwards compatibility, all the physical layer devices that operate in that band use the Clause 17 OFDM preamble. Of note, general reference to "Clause" or "Clauses" refers to a clause in the IEEE 802.11—2020 Standard.

A Wi-Fi network traffic analyzer may be used to monitor Wi-Fi DSSS and OFDM signals across the 2.4 GHz band and OFDM signals across the 5 GHz band. To receive and demodulate any signal in the 2.4 GHz band, without prior knowledge of the channel, would generally require a broadband receiver with 13 or 14 channel processors, and in the 5 GHz band, at least 38 channel processors. However, in the general sense, at no time in the 2.4 GHz band would there be 14 signals simultaneously present and similarly in the 5 GHz band, it is unlikely that there would be 24 signals simultaneously present. Hence, a Wi-Fi network traffic analyzer may be designed to detect and demodulate signals across the 2.4 GHz and 5 GHz bands with a bank of channel processors smaller than the available channel set. In this case, however, a smart signal router (SSR) is required in order to steer signals to available channel processors.

In the 2.4 GHz band, the channels are generally separated by 5 MHz, but the Wi-Fi signals for 802.11b and 802.11g devices occupy a bandwidth in the order of 20 MHz. In the specific case of 802.11b devices, the DSSS preamble waveform is subject to false packet detection on neighboring channels which, if not mitigated against, will result in the unnecessary allocation of channel processors.

SUMMARY

Methods and traffic analyzers for detection of wireless communication network packets corresponding to a desired waveform type across a wideband. According to one aspect, a method includes receiving a wideband signal and sampling the wideband signal at a wideband signal sample rate. The method also includes filtering the wideband signal to produce N channel signals in N channels, N being an integer greater than 1,the N channel signals being sampled at a rate less than the wideband signal sample rate. The method further includes routing the N channel signals to L channel processors, L being an integer less than N. The method includes demodulating each routed channel signal in a channel processor of the L channel processors to derive a plurality of demodulated packets, and collecting the demodulated packets in a packet collector.

According to another aspect, a communication network traffic analyzer for detection of wireless communication network packets corresponding to a desired waveform type across a wideband is provided. The analyzer includes a receiver configured to: receive a wideband signal; and sample the wideband signal at a wideband signal sample rate. The analyzer includes a filter bank configured to filter the wideband signal to produce N channel signals in N channels, N being an integer greater than 1, the N channel signals being sampled at a rate less than the wideband signal sample rate. The analyzer also includes a router configured to route the N channel signals to L channel processors, L being an integer less than N. The analyzer further includes L channel processors configured to demodulate each routed channel signal to derive a plurality of demodulated packets. The analyzer also includes a collector configured to collect the demodulated packets in a packet collector.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

A method and devices are disclosed for a wideband Wi-Fi network analyzer that detects the presence of packets corresponding to a desired waveform type, and routes detected signals to a bank of demodulator resources, i.e., channel processors, based on availability and need. Furthermore, to mitigate the case of Wi-Fi for 802.11b devices where the DSSS preamble is subject to false detection on neighboring channels, a neighbor channel filter (NCF) is also disclosed.

Figure 1:
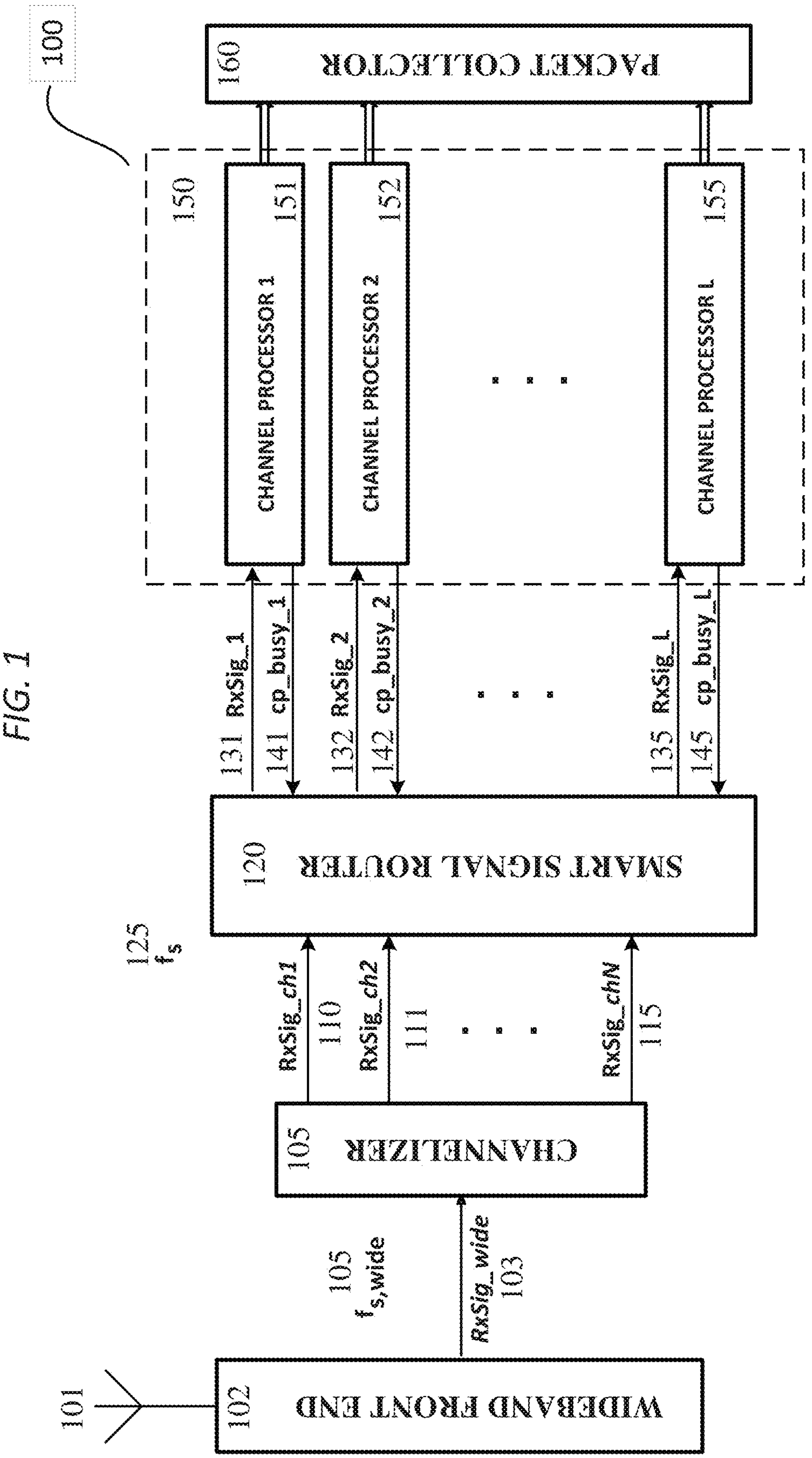
FIG. 1 is an example block schematic diagram of a Wi-Fi network traffic analyzer that may be used to monitor Wi-Fi Clause 15, 16, 17 and 18 signals across a wide band.

FIG. 1 is an example block schematic diagram of a basic Wi-Fi network traffic analyzer 100 that may be used to monitor Wi-Fi Clauses 15, 16, 17 and 18 signals across a wide band. In some embodiments the Wi-Fi network traffic analyzer 100 includes an antenna 101, a wideband front end 102, a channelizer 105, a smart signal router SSR 120, a bank of channel processors 150, and a packet collector block 160. The wideband front end 102 may perform the usual functions of an RF front end such as low noise amplification, filtering, and I/Q frequency down conversion so as to condition the received signal for inputting to the channelizer 105. Channelizer 105 may perform the function of filtering the wideband received signal into discrete channels. For example, if the wideband front end 102 detects signals across the 2.4 and 5 GHz band there may be fourteen 5 MHz channels and twenty-four 20 MHz Wi-Fi channels. For a given waveform type, a number of sampled, complex, wideband signals. RxSig_wide 103, may be received at sample frequency $f_{s,wide}$ 105 on each of one or more sub-bands, and passed through Channelizer block 105, which breaks the wide band signal(s) down into N sampled signals/channels, e.g., RxSig_ch1 110, RxSig_ch2 111, RxSig_chN 115, at sample rate $f_s$ 125, where $f_s \ll f_{s,wide}$. For example, for DSSS, $f_{s,wide}$ may be 480 MHz on a single sub-band with $f_s$=22 MHz, and for OFDM, $f_{s,wide}$ may be 480 MHz on each of four sub-bands, whereby the channelizer processes the four wideband signals into a plurality of signals each sampled at $f_s$=20 MHz. Smart Signal Router (SSR) 120 may examine the set of N sampled signals and detect if a signal is present on any of the N channels. If a signal is detected then SSR 120 may route the signal to an available channel processor (CP) in the bank of channel processors 150. The SSR 120 may output up to L detected signals, e.g., RxSig_1 131, RxSig_2 132, RxSig_L 135 to a bank of L Channel Processors (CPs), e.g., channel processor 1 151, channel processor 2 152, channel processor L 155. Each CP is capable of processing a complex signal received at sample rate $f_s$ 125 and demodulating signals of the given waveform type, e.g., RxSig_1 131, RxSig_2 132, RxSig_L 135. The number of CPs, L, is less than, or even much less than, the number of channels N. If a CP is already processing a signal, then it will indicate cp-busy to the SSR 120, e.g., cp_busy_1 141, cp_busy_2 142, cp_busy_L 145, and SSR 120 will then direct a RxSig for which a packet has been detected to a non-busy CP. Each CP will demodulate a signal that it receives from SSR 120 and output the result to a packet collector 160.

Wi-Fi network traffic analyzer 100 uses a bank of L CPs where L is less than the number of channels N and hence requires an SSR 120 in order to route detected signals or packets to an available CP. If there was a CP for every channel, i.e., L=N, then the SSR 120 is not required. In the 2.4 GHz band there are only 3 non-overlapping channels, but signals may be centered on any of the available 14 channels. However, due to the restricted bandwidth, in the general sense it is unusual for more than 3 signals without errors to be present at any one time. Hence, in this example, for the 2.4 GHz band, the number of channels, N, may be 13 and the number of CPs, L, may be, say, 3 or 4. In the 5 GHz band, the number of non-overlapping channels, N, may be 24 and hence the number of CPs, L, required would depend upon the traffic intensity, but in the general sense the number of CPs, L, may be significantly less than the number of channels N. Incorporating an SSR 120 therefore enables an efficient Wi-Fi network traffic analyzer to be realized with significant savings in hardware.

Figure 2:
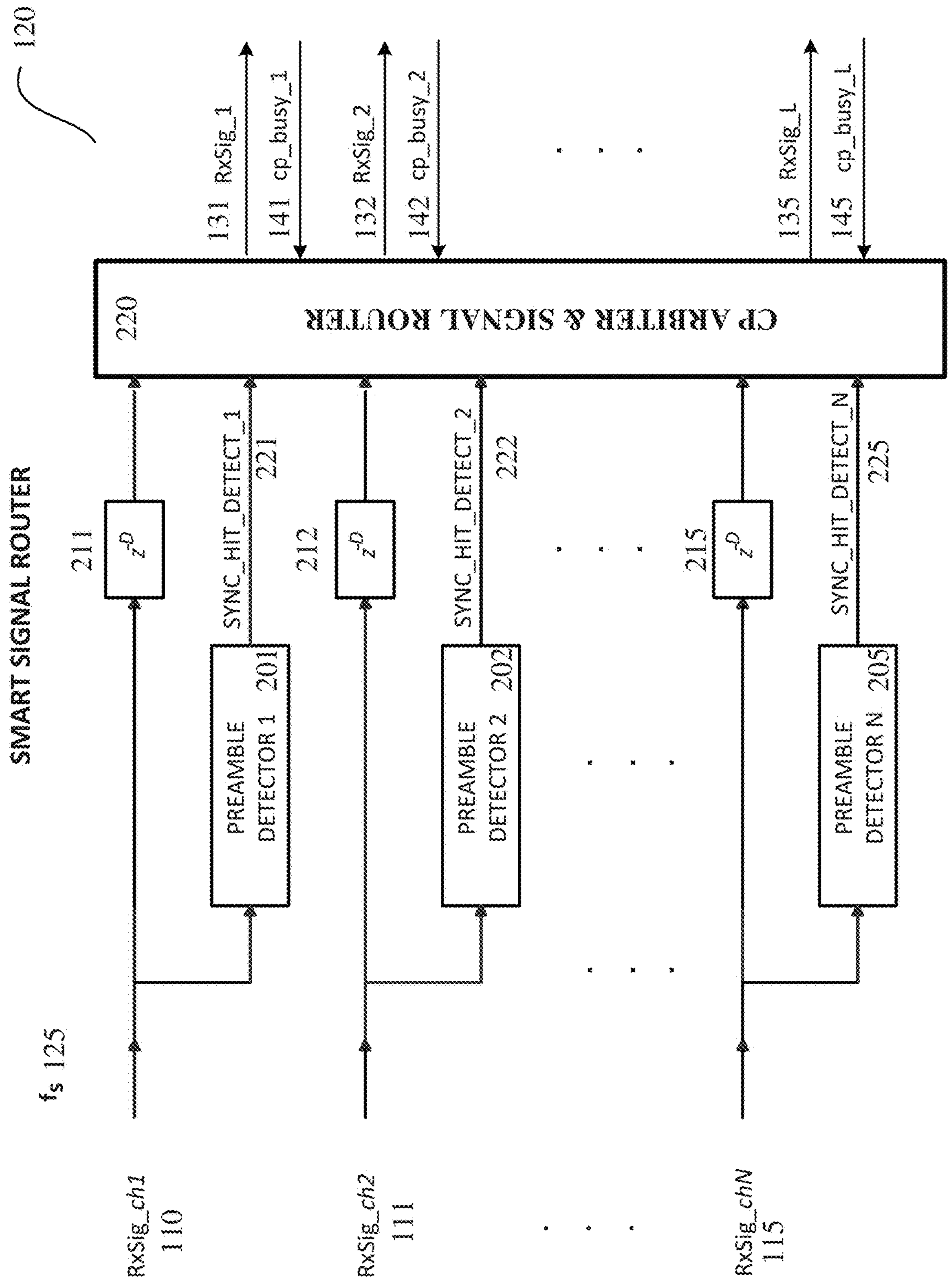
FIG. 2 is an example block diagram of one implementation of a smart signal router SSR, where sampled received signals on N channels are routed to L channel processors (CPs)

FIG. 2 is an example block diagram of one implementation of a smart signal router SSR 120, where sampled received signals on N channels, e.g., RxSig_ch1 110, RxSig_ch2 111, RxSig_chN 115, are routed to L CPs. The N sampled received signals are each inputted to N preamble detectors 201, 202, 205 and also to N delays 211, 212, 215. Any time a preamble detector 201, 202, 205 detects a valid preamble on any one of the channels, a SYNC_HIT DETECT, e.g., SYNC_HIT DETECT_1 221, SYNC_HIT DETECT_2 222, SYNC_HIT DETECT_N 225, is sent to the CP Arbiter and Signal Router 220. For example, if preamble detector 202 detects a valid signal preamble on RxSig_ch2 111, SYN_HI_DETECT 222 is set indicating to CP Arbiter and Signal Router 220 that a valid preamble has been detected. CP Arbiter and Signal Router 220 will then look for an available CP by examining the cp_busy signals, e.g., cp_busy_1 141, cp_busy_2 142, cp_busy_L 145, from the bank of L CPs. For example, if channel processor 2 152 is available then cp_busy_2 142 is not set and hence CP Arbiter and Signal Router 220 knows that channel processor 2 152 is available. CP Arbiter and Signal Router 220 may then select to route RxSig_ch2 111, via delay 212, as RxSig_2 132, to channel processor 2 152. Channel processor 2 152 would then set cp_busy_2 142 to indicate that it is not available. Once channel processor 2 152 has finished demodulating RxSig_2 132, then it sets cp_busy_2 142 to indicate that it is again available. Prior to routing RxSig_ch2 111, as RxSig_2 132, to channel processor 2 152, the signal is delayed by D samples, via delay 212 such that the received preamble signal is still available to the CP, after routing. The value of delay D is dependent upon the length of the preamble signal, DSSS or OFDM.

As specified in Clauses 15 and 16, every DSSS packet begins with either a short or long preamble, where either preamble type is generated by modulating a known, a priori bit sequence as binary differential phase-shift keying (DBPSK) at a rate of 1 Mbps, followed by Barker spreading using a fixed, length-11 Barker sequence, thus resulting in a transmitted chip rate of 11 Mbps. Hence, for DSSS, the signals, RxSig_ch1 111, RxSig_ch2 112, RxSig_chN 115, inputted to the preamble detectors 201, 202, 205, are complex samples at a rate of $f_s$=22 MHz, or two samples per DSSS chip. In a DSSS preamble detector, the complex selectivity output signal may be passed through a free-running de-spreader and differential detector, which, effectively, converts the real part of the received preamble into a binary antipodal waveform, exhibiting its strongest correlation with the a priori binary preamble sequence at the center of the last chip of the received preamble signal. In the case of DSSS signals, therefore, a preamble detector, e.g., 201, 202, 205, feeds the real part of the de-spread and differentially demodulated signal into, both, a long and short binary preamble detector. Such detectors may be realized with a minimum amount of hardware. Preamble detection of Wi-Fi DSSS signals is known.

The Wi-Fi DSSS waveform design is such that a signal transmitted on a given channel will also be detected by the binary preamble detectors several channels away, even if the signal is subject to attenuation by channelizer selectivity filters. It is known that a preamble transmitted on a given channel may be detected by a binary preamble detector up to ±4 channels away. This is a problem for the SSR 120 as the CP Arbiter & Signal router 220 will attempt to route multiple copies of the same signal, e.g., RxSig_ch1 110, to available CPs, e.g., 151, 152, 155, with the result that, if not enough CPs are made available, signals will be lost arbitrarily.

Figure 3:
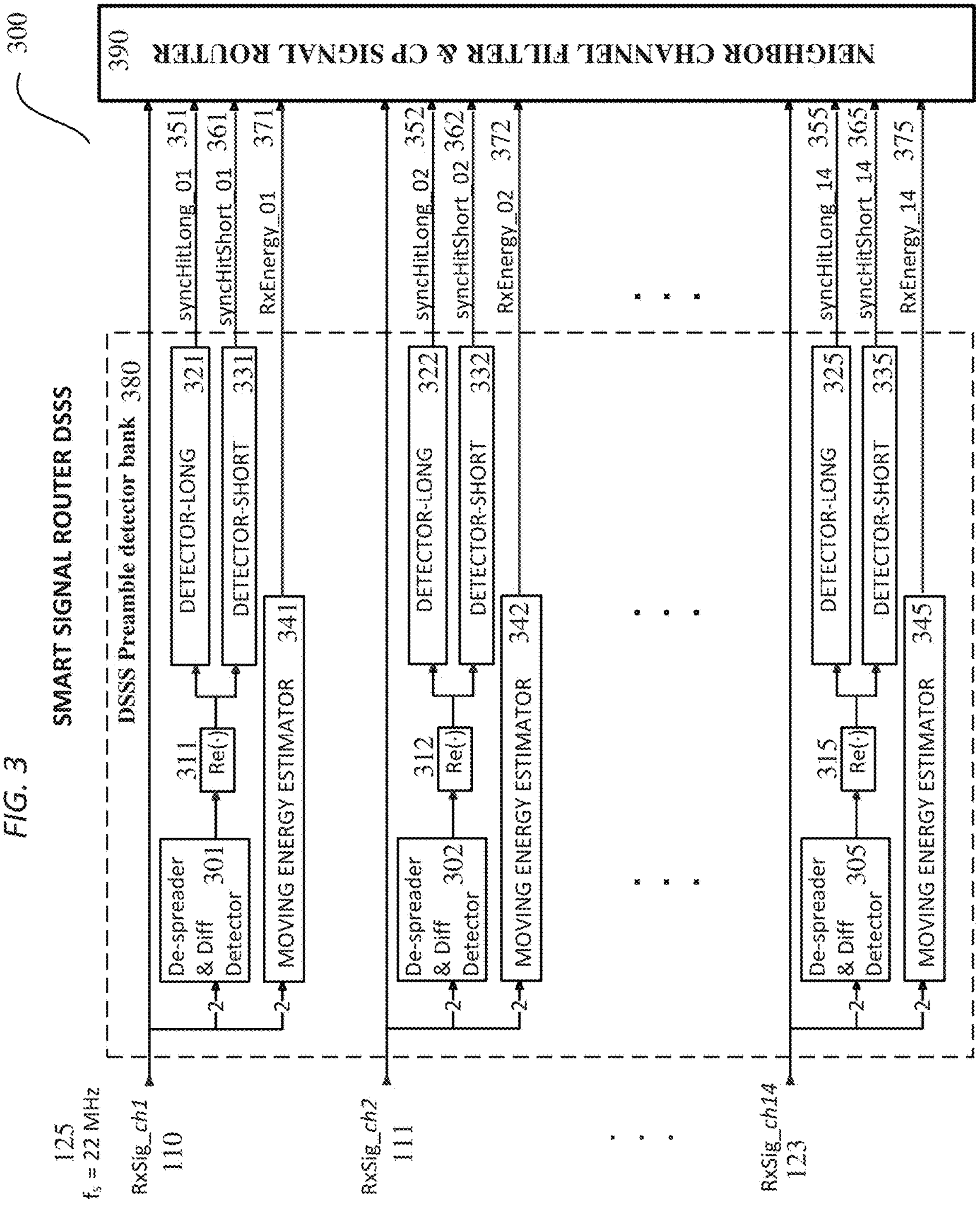
FIG. 3 is an example block diagram of a Smart Signal Router for DSSS (SSR-DSSS) that mitigates the false neighbor channel preamble detection problem by incorporating moving energy estimators, in the bank of 14 DSSS preamble detectors, and also by including a Neighbor Channel filter (NCF) into the neighbor channel filter & CP signal router.

FIG. 3 is an example block diagram of an example SSR-DSSS 300 that mitigates the false neighbor channel preamble detection problem by incorporating moving energy estimators, e.g., 341, 342, 345 in the bank of 14 DSSS preamble detectors 380, and also by including an NCF into the neighbor channel filter & CP signal router 390. In this example SSR-DSSS 300, 14 input signals, e.g., RxSig_ch1 110, RxSig_ch2 110, RxSig_ch14 123, are inputted into the bank of DSSS preamble detectors 380 and the neighbor channel filter & CP signal router 390. Prior to each DSSS preamble detector, the complex input signal, e.g., RxSig_ch1 110, RxSig_ch2 110, RxSig_ch14 123 is passed through a free-running de-spreader and differential detector, e.g., 301, 302, 305, and then the real part of the received preamble is selected, e.g., 311, 312, 315, and inputted to a long preamble detector, detector-long, e.g., 321, 322, 325 and a short preamble detector, detector-short, e.g., 331, 332, 335. If any of the detector-longs detects a long DSSS preamble, then the respective synchronization hits, e.g., syncHitLong_01 351, syncHitLong_02 352, syncHitLong_14 355 are asserted. Similarly, if any of the detector-short detects a short DSSS preamble, then the respective synchronization hits, e.g., syncHitShort_01 361, syncHitShort_02 362, syncHitShort_14 365, are asserted.

In each DSSS preamble detector the complex input signal, e.g., RxSig_ch1 110, RxSig_ch2 110, RxSig_ch14 123 is also applied to a moving energy estimator, e.g., 341, 342, 345. Each moving energy estimator measures energy over an energy estimation window length, Ne. For an input complex signal r(n), the moving energy estimate, e(n), is derived as follows:

$$e(n) = \sum_{m=0}^{Ne-1} |r(n-m)|^2 = e(n-1) + x(n) - x(n-Ne) \tag{1}$$

where Ne is the energy estimation window length and $$x(n) = |r(n)|^2$$

Figure 4:
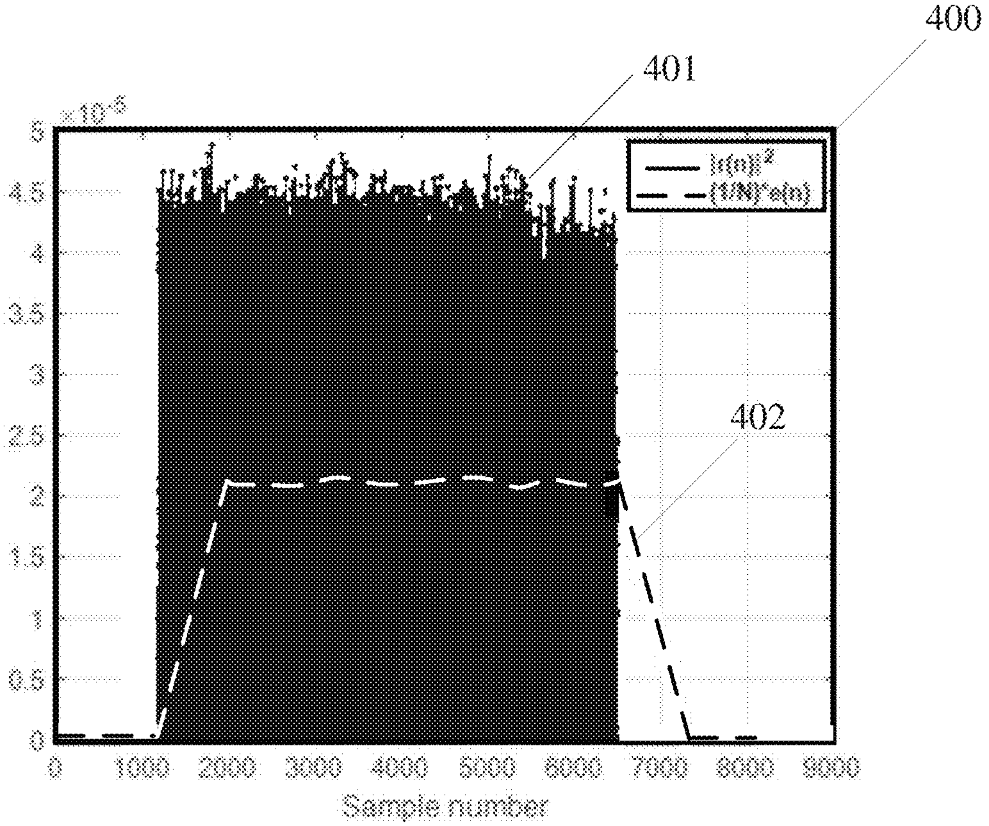
FIG. 4 is an example of the energy estimation for a DSSS packet for a window length N=880, showing $|r(n)|^2$ and $1/N*e(n)$.

FIG. 4 is an example graph 400 of the energy estimation, equation (1), for a DSSS packet for a window length Ne=880, showing $|r(n)|^2$ 401 and 1/Ne*e(n) 402. The value 1/Ne*e(n) is used as the output, RxEnergy, from the moving energy estimator. The respective output energies, e.g., RxEnergy_01 371, RxEnergy_02 372, RxEnergy_14 375, from the moving energy estimators, e.g., 341, 342, 345, are inputted to the neighbor channel filter & CP signal router 390.

Figure 5:
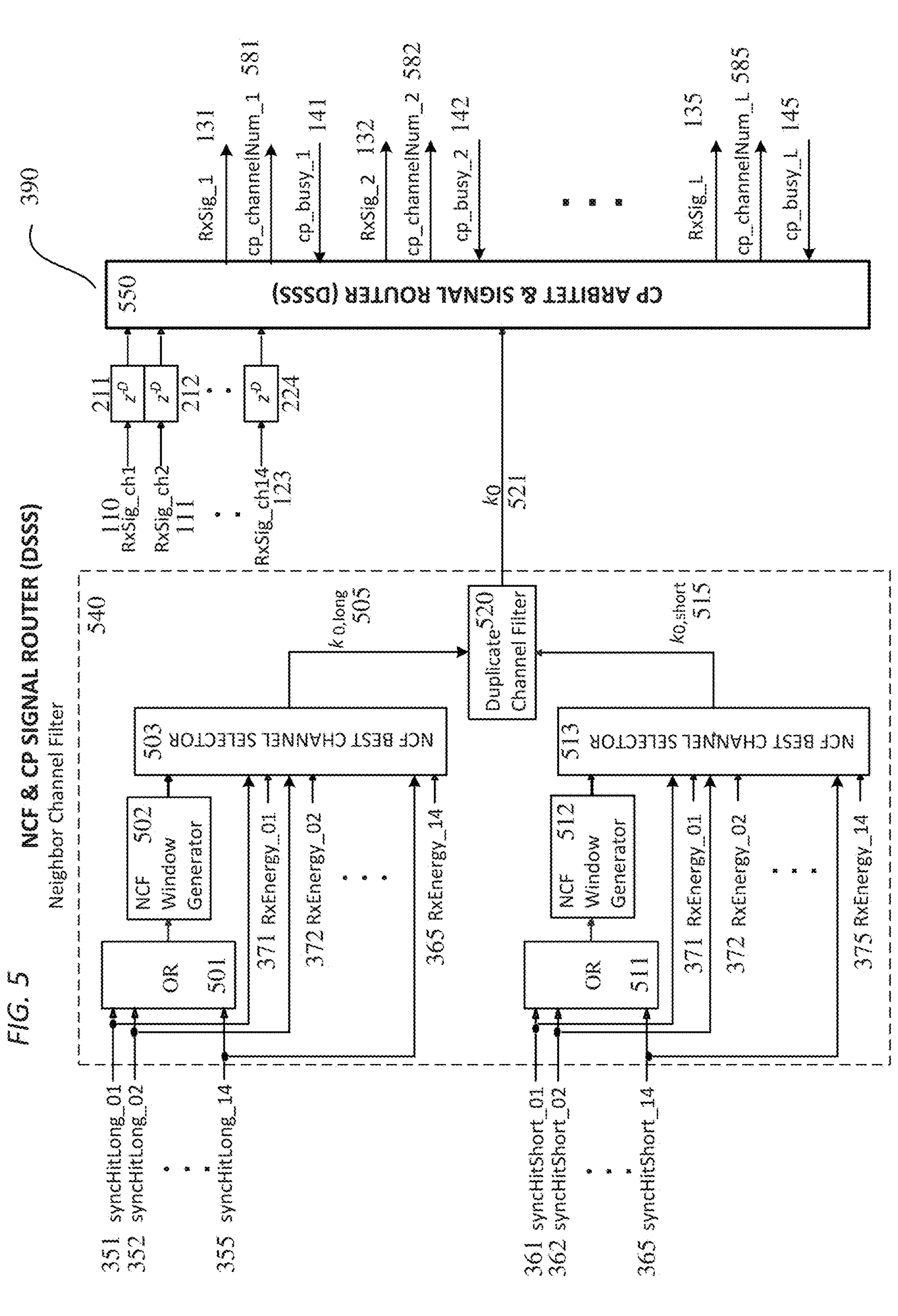
FIG. 5 is an example block diagram of a neighbor channel filter & CP signal router.

FIG. 5 is an example block diagram of a neighbor channel filter & CP signal router 390. The neighbor channel filter & CP signal router 390 comprises two main sections, NCF 540, and channel filter arbiter & signal router (DSSS) 550. NCF 540 comprises two sections. As shown in FIG. 5, the upper section is for filtering packets detected as the long DSSS preamble type, and the lower section is for filtering packets detected as the short DSSS preamble type. All 14 syncHitLong inputs, e.g., syncHitLong_01 351, syncHitLong_02 352, syncHitLong_14 355, from the respective 14 detector-long units, e.g., 321, 322, 325, are inputted to OR gate 501, and similarly all 14 syncHitShort inputs, e.g., syncHitShort_01 361, syncHitShort_02 362, syncHitShort_14 365, from the respective detector-short units, e.g., 331, 332, 335, are inputted to OR gate 511. The output of OR gate 501 is inputted to NCF window generator 502 and the output of OR gate 501 is inputted to NCF window generator 512. From an idle state, NCF Window Generator 502 opens a window of fixed duration if any synchronization hit, e.g., syncHitLong_01 351, syncHitLong_02 352, syncHitLong_14 355, is detected on any one of the 14 channels. Similarly, from an idle state, NCF Window Generator 512 opens a window of fixed duration if any synchronization hit, e.g., syncHitShort_01 361, syncHitShort_02 362, syncHitShort_14 365, is detected on any one of the 14 channels. NCF Window Generators 502 and 512 open for evaluating all of the ensuing synchronization hits within their respective open windows. For Wi-Fi DSSS, a collapse window duration of 1.75 μsec, or 39 samples, may be used, as the binary correlators tend to produce synchronization hits well before and after the actual correlation peak. The windowed long synchronization hits are outputted from NCF Window Generator 502 to NCF Best Channel Selector 503, and the windowed short synchronization hits are outputted from NCF Window Generator 512 to NCF Best Channel Selector 513. In addition, the 14 outputs, e.g., RxEnergy_01 371, RxEnergy_02 372, RxEnergy_14 375, from the 14 moving energy detectors (341, 342, 345), are inputted to each NFC Best Channel Selector 503, 513. The 14 outputs, e.g., syncHitLong_01 351, syncHitLong_02 352, syncHitLong_14 355, are also inputted to NCF Best Channel Selectors 503. Similarly, the 14 outputs, e.g., syncHitShort_01 361, syncHitShort_02 362, syncHitShort_14 365, are also inputted to NCF Best Channel Selectors 513. Each of the NCF Best Channel Selectors 503, 513, evaluates which channel, 1-14, has the highest value of RxEnergy associated with a synchronization hit at the end of the window opened by the NCF window generator 502, 503, respectively, and outputs the corresponding channel index $k_{0,long}$ 505, $k_{0,short}$ 515 respectively, most likely to be carrying the packet associated with the detected preamble. Since the CP, e.g., 151, 152, 155, may only be capable of discerning a single preamble type when both types are detected within a short window, a Duplicate Channel Filter 520 may be used to select only a single channel index $k_0$ 521 within a time window similar in length to that of the NCF Best Channel Selector, 503, 513, as generated by the NCF Window Generator 502, 512, thus ensuring that the traffic analyzer does not duplicate two of the same packet.

The 14 channelized received signals, e.g., RxSig_ch1 110, RxSig_ch2 111, to RxSig_ch14 123, outputted from Channelizer 105, are inputted via delays, 211, 212, to 224, to the CP Arbiter & Signal Router (DSSS) 550. CP Arbiter & Signal Router (DSSS) 550 will then look for an available CP in the bank of L CPs 150, by examining the cp_busy signals, e.g., cp_busy_1 141, cp_busy_2 142, cp_busy_L 145, and then pass the delayed RxSig corresponding to the channel index as indicated by the output $k_0$, from the Duplicate Channel filter 520. In addition to routing the delayed RxSig, the channel number, e.g., cp_channelNum_1 581, cp_channelNum_2 582, cp_channelNum_L 585, as derived from the NCF Best Channel Selectors, 503, 513 and the Duplicate Channel filter 520, may also be routed to the selected CP as this may be informative when delivering the final packets to the Packet Collector 160.

Additional logic could be added to account for channel distance, based on the assumption that false detections are only possible from so many channels away, however, since this distance is already so high (±4) compared to the number of channels (14), such additional logic and effort has a small advantage and is not included in FIG. 5.

Figure 6:
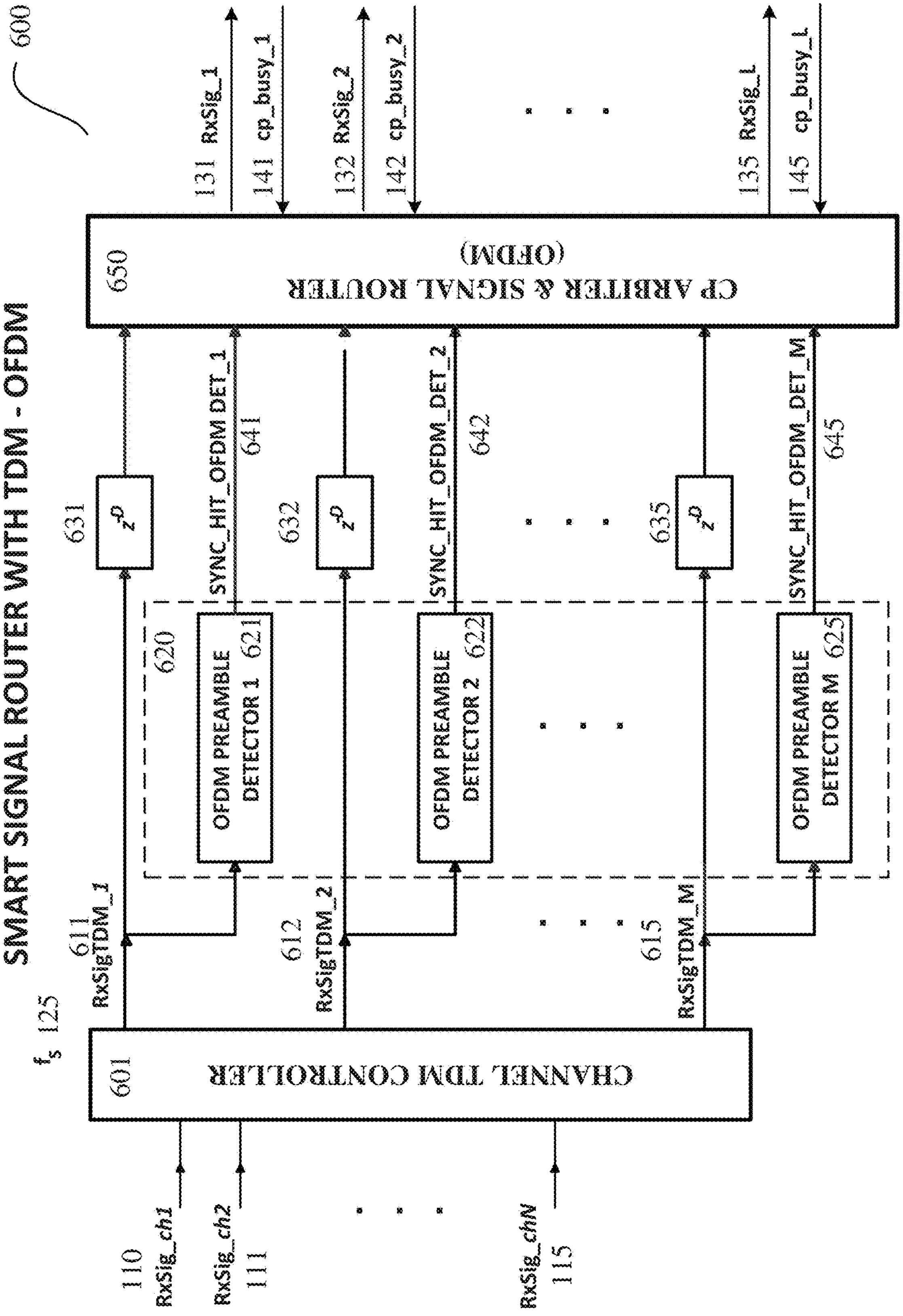
FIG. 6 is an example block diagram of another implementation of a smart signal router SSR which incorporates a channel time division multiplex (TDM) controller in order to reduce the number of preamble detectors required when the number of channels N may be large such as OFDM signals across the 2.4 and 5 GHz bands.

FIG. 6 is an example block diagram of another implementation of a smart signal router SSR 600 which incorporates a channel time division multiplex (TDM) controller 601 used to reduce the number of preamble detectors when the number of channels N may be large, for example such as the number of OFDM channels in the 2.4 and 5 GHz bands, i.e., 38 in total. For a period $T_{dwell}$, the channel TDM controller 601 provides a subset RxSigTDM_1 611, RxSigTDM_2 612, to RxSigTDM_M 615, of the N received signals, RxSig_ch1 110, RxSig_ch2 111, to RxSig_chN 115, to a bank of M OFDM preamble detectors 620, and also to M delays, e.g., 631, 632, 633. Similar to that discussed above with reference to FIG. 2, any time an individual OFDM preamble detector, e.g., 621, 622, 625 detects a valid OFDM preamble on any one of the N channels, a SYNC_HIT_OFDM_DETECT 641, 642, 645, is sent to the CP Arbiter and Signal Router (OFDM) 650. CP Arbiter and Signal Router (OFDM) 650 will then look for an available CP, e.g., 151, 152, 155, by examining the cp_busy signals, e.g., 141, 142, 145, from the bank of CPs.

For example, if $T_{dwell}$ is set to 0.25 seconds, N=38 channels and M=13, then for a period of 0.25 seconds a subset of 13 channels of the 38 available channels are monitored by the 13 preamble detectors. Hence:

- for 0≤t≥0.25, the 13 preamble detectors, 201, 202 to 323 are monitoring channels 1, 2, 3, 4, 5, 6, 7, 8, 9, 10, 11, 12, 13;
- for 0.25≤t≥0.50, the 13 preamble detectors, 201, 202 to 323 are monitoring channels 14, 15, 16, 17, 18, 19, 20, 21, 22, 23, 24, 25, 26;
- for 0.50≤t≥0.75, the 13 preamble detectors, 201, 202 to 323 are monitoring channels 27, 28, 29, 30, 31, 32, 33, 34, 35, 36, 37, 38, 1;
- for 0.75≤t≥1, the 13 preamble detectors, 201, 202 to 323 are monitoring channels 2, 3, 4, 5, 6, 7, 8, 9, 10, 11, 12, 13, 14;

and so on.

Hence, the channel TDM controller 601 is operating with three phases. Without the channel TDM controller 601, 38 OFDM preamble detectors, e.g., 621, 622, 625, would be required in order to detect signals across the 2.4 and 5 GHz bands. With the channel TDM controller, 601, as discussed in the example above, the number of OFDM preamble detectors may be reduced. For example, for M=19, then the channel TDM controller 601 would be operating with 2 phases, and for M=10, the channel TDM controller 601 would be operating with 4 phases.

Similar to the discussion above with reference to FIG. 2, any time an OFDM preamble detector preamble, e.g., 621, 622, 625, detects a valid preamble on any one of the N channels, a SYNC_HIT_OFDM_DET signal, e.g., 221, 222, 343, is sent to the CP Arbiter and Signal Router (OFDM) 650. CP Arbiter and Signal Router (OFDM) 650 will then look for an available CP, e.g., 151, 152, 155, by examining the cp_busy signals, e.g., 141, 142, 145, from the bank of CPs 150. If a CP is available, i.e., the respective cp_busy indication is not set, then the respective RxSig_ch signal is delayed, via delays 631, 632, 635 and then routed, via CP Arbiter & Signal Router (OFDM) 650, to the available CP. This means the CP may finish processing a packet from a given channel, even if the Channel TDM Controller 601 has switched TDM phases, and the SSR 600 is no longer detecting packets on that channel.

If, during a given TDM phase, a preamble signal is almost entirely received but has not produced a full correlation and therefore a synchronization hit, if the TDM phase changes just before the preamble has fully entered the correlator, a partial correlation will occur shortly after the TDM phase change. This partial correlation may be strong enough to produce a false synchronization hit which will result in the CP Arbiter & Signal Router (OFDM) 650 being triggered by a signal from the wrong channel. Therefore, each OFDM preamble detector is reset at the time that the TDM phase changes.

A generally known method for detection of an OFDM preamble is to auto-correlate the received signal where the received signal is cross-correlated with a delayed version of the received signal. When the received signal consists only of noise, the output of the autocorrelation is zero-mean random variable. Complex correlation, however, requires computational complexity and a need for relatively large silicon areas due to the multiplication of complex numbers Another, highly efficient known method for detection of an OFDM preamble defines a bank of correlators where a piece-wise approximation of the correlation template offset oscillators is invoked so as to realize the complete correlator bank for the cost of a single correlator, plus an additional, outer mixing and assembly stage. The number M of OFDM preamble detectors is constrained by their complexity and available processing capacity. As depicted in the example of FIG. 6, for M=13, the inclusion of 13 OFDM preamble detectors are required. It will be clear to one skilled in the art, that the details of the TDM scheme will be dependent upon the number of OFDM preamble detectors used, which, in turn, will be dependent upon the availability of hardware and processing resources.

Figure 7:
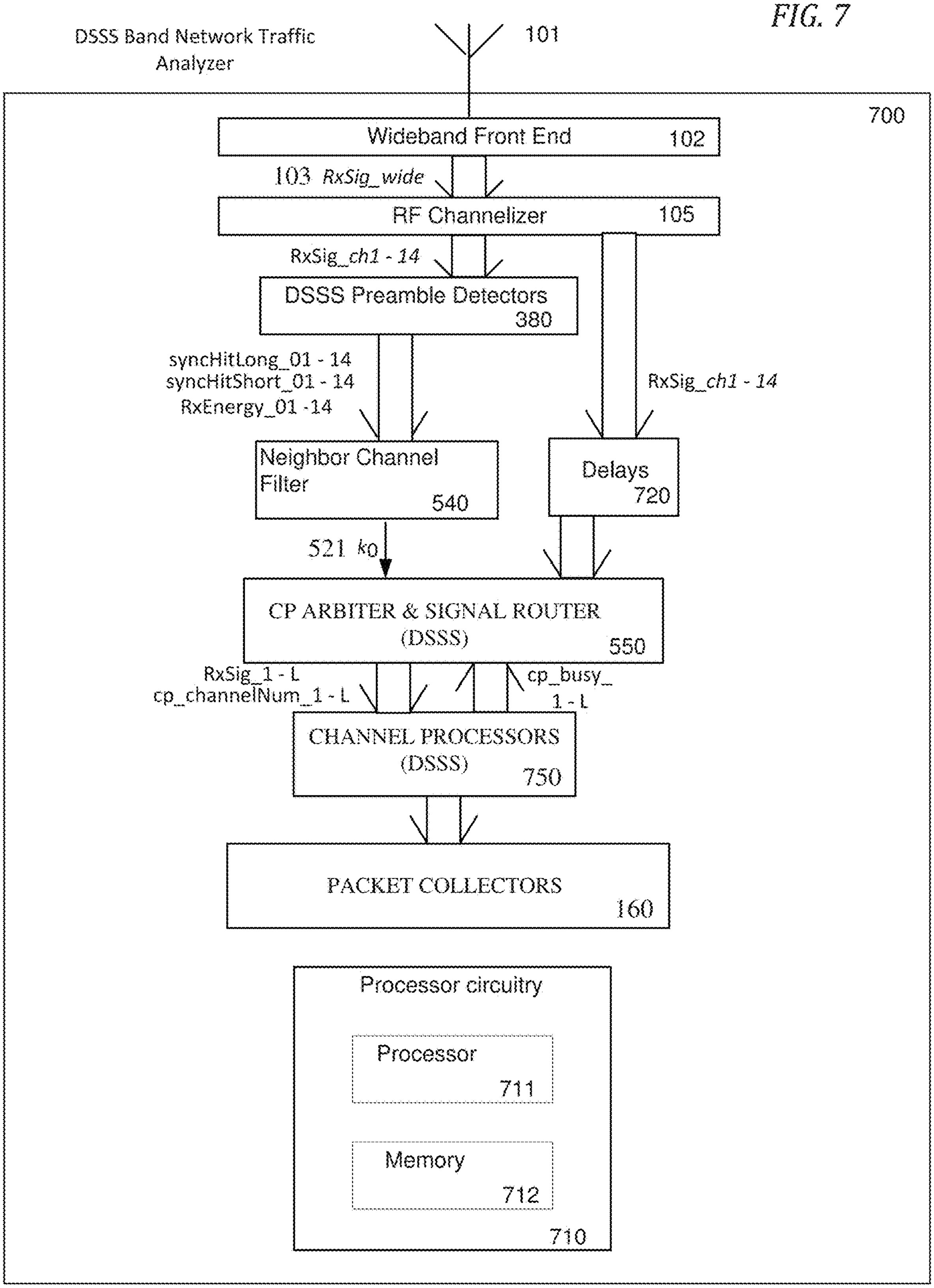
FIG. 7 is a block diagram of an example of a network traffic analyzer that may be used to monitor Wi-Fi Clauses 15, and 16 signals across the entire 2.4 GHz band.

FIG. 7 is a block diagram of an example of a network traffic analyzer 700 that may be used to monitor Wi-Fi Clauses 15 and 16 device signals across the entire 2.4 GHz band. In some embodiments the network traffic analyzer 700 includes an antenna 101, a wideband front end 102, a radio frequency (RF) channelizer 105, a bank of DSSS Preamble Detectors 380, Neighbor Channel Filter 540, delays 720, CP Arbiter & Signal Router (DSSS) 550, Channel Processors (DSSS) 750, Packet Collectors 160 and processing circuitry 710.

The wideband front end 102 may perform the usual functions of an RF front end such as low noise amplification, filtering, and I/Q frequency down conversion so as to condition the received signal for inputting to the RF channelizer 105. The RF channelizer 105 may perform the function of filtering the wideband received signal into discrete channels. For example, if the wideband front end 102 detects signals across the 2.4 GHz band there are 14 Wi-Fi channels. The individual 14 channel I/Q data streams, e.g., RxSig_ch_1 110, RxSig_ch_2 111, RxSig_ch_14 123, may be inputted to the bank of DSSS Preamble Detectors 380.

As discussed above with reference to FIG. 3, the SyncHitLong, SyncHitShort and RxEnergy outputs from the bank of DSSS Preamble detectors 380 are inputted to the Neighbor Channel Filter 540 and the 14 individual channel I/Q data streams, e.g., RxSig_ch_1 110, RxSig_ch_2 111, RxSig_ch_1 123, are inputted, via a bank of delays 720, to CP Arbiter & Signal Router (DSSS) 550. The bank of delays 720 may include 14 delays as depicted in FIG. 5, e.g., 211, 212, 224. As discussed above with reference to FIGS. 2 and 5, the CP Arbiter & Signal Router (DSSS) 550 may route an RxSig signal detected on one of the 14 channels, to an available channel processor in the bank of Channel Processors (DSSS) 750. As discussed above with reference to FIG. 1, the bank of Channel Processors (DSSS) 750 may include L channel processors, e.g., 151, 152, 155. As discussed above with reference to FIG. 5, the Neighbor Channel Filter 540 may output the channel index ko 521 to the CP Arbiter & Signal router (DSSS) 550. The CP Arbiter & Signal Router (DSSS) 550 may then examine the cp_busy inputs and if a CP is available then the detected signal RxSig, together with the channel index, cp_channelNum, may be input to that available CP. The bank of L Channel Processors (DSSS) 750 may perform the Wi-Fi 802.11b functions of descrambling and demodulating the signals suitable for inputting to Packet Collectors 160 where the individually received packets may be stored.

The functions of the wideband front end 102, an RF channelizer 105, DSSS Preamble Detectors 380, Neighbor Channel Filter 540, delays 720, CP Arbiter & Signal Router (DSSS) 550, Channel Processors (DSSS) 750, Packet Collectors 160 may be performed by one or more processors and/or processor cores and/or FPGAs. In some embodiments, the wideband front end 102, an RF channelizer 105, DSSS Preamble Detectors 380, Neighbor Channel Filter 540, delays 720, CP Arbiter & Signal Router (DSSS) 550, Channel Processors (DSSS) 750, Packet Collectors 160 and/or the processing circuitry 710 may comprise a processor 711, integrated circuitry for processing and/or control, e.g., one or more processors and/or processor cores and/or FPGAs (Field Programmable Gate Array) and/or ASICs (Application Specific Integrated Circuitry) configured to execute programmatic software instructions. In some embodiments some or all of the functions of the wideband front end 102, RF channelizer 105, DSSS Preamble Detectors 380, Neighbor Channel Filter 540, delays 720, CP Arbiter & Signal Router (DSSS) 550, Channel Processors (DSSS) 750, Packet Collectors 160, may be performed by the processing circuitry 710. The processing circuitry 710 may be configured to control any of the methods and/or processes described herein and/or to cause such methods, and/or processes to be performed. The memory module 712 is configured to store data, programmatic software code and/or other information described herein. In some embodiments, the software may include instructions that, when executed by the processing circuitry 710, causes the processing circuitry 710 to perform the processes described herein with respect to the network traffic analyzer 700.

In other words, Network traffic analyzer 700 may continuously monitor the 2.4 GHz band to detect DSSS preambles on any of 14 channels. The possibility of false channel DSSS detection on overlapping channels is mitigated by the Neighbor Channel Filter 540. CP Arbiter & Signal Router (DSSS) 550 routes detected signals with DSSS preamble to a bank of L1 channel processors, Channel Processors (DSSS) 750, that demodulate the signals into received packets that may be stored in packet collectors 160.

In order to estimate the number L1 of channel processors required in Channel Processors (DSSS) 750, the following traffic model analysis is made.

Traffic model parameters:

| | |
|---|---|
| Number of Clause 16 Wi-Fi stations | 32 |
| Number of channels | 14 |
| Number of trials | 25 |

The following parameters are randomly selected:

| | |
|---|---|
| Channel selection | 1-14 |
| Preamble | long or short |
| Data Rate | 1, 2, 5.5, 11 Mbps |
| Payload | 4 to 64 octets |
| Frequency offset and symbol timing drift | |
| Packet time of arrival | .00454 to 5.12 ms |
| Simulation trial duration variation | 4.97 to 6.07 ms |

The following configurations are considered and analyzed:

A. 14 dedicated CPs (L1=14), no Smart Signal Router, SSR.

B. 5 CPs (L1=5) with SSR, without Neighbor Channel Filter, NCF.

C. 5 CPs (L1=5) with SSR and NCF.

The result of the analysis in terms of the number of detected packets, number of false packets, and number of successful, error-free packets, for each configuration is given in Table 1.

TABLE 1

Traffic analysis

| Configuration | # detected packets | # false packets | # successful packets |
|---|---|---|---|
| A 14 channels, no SSR | 638 | 12 | 554 |
| B L = 5, SSR, no NCF | 598 | 7 | 523 |
| C L = 5, SSR and NCF | 608 | 0 | 542 |

The average duty cycles of the 5 CPs used in configurations B and C, are given in Table 2.

TABLE 2

Average Duty Cycle per CP

| Configuration | CP 1 | CP2 | CP3 | CP4 | CP5 |
|---|---|---|---|---|---|
| B L = 5, SSR, no NCF | 0.2542 | 0.1451 | 0.1398 | 0.1181 | 0.0665 |
| C L = 5, SSR and NCF | 0.4333 | 0.2107 | 0.0460 | 0.0094 | 0.0007 |

From Table 1 it may be noted that with configuration C, 5 CPs with SSR and NCF, almost the same number of packets were successfully received as the 14 CPs used in configuration A, but with zero false packets. Configuration B, 5 CPs without NCF, detected a few less packets than configuration C. Of particular interest is that, as shown in Table 2, the CP usage indicates that under these traffic conditions, with configuration C, using NCF, only the first two CPs are indicated as busy, therefore suggesting that most of the packets may be collected with only two CPs. In contrast with configuration B, no NCF, i.e., no duplicate channel detection, the load is spread over 4 or 5 CPs. This shows that the inclusion of the Neighbor Channel Filter 540 does mitigate the duplicate channel problem. Hence, for this network traffic example, the network traffic analyzer 700 could be constructed with, for example, only, say, 3 CPs, i.e., L1=3.

Figure 8:
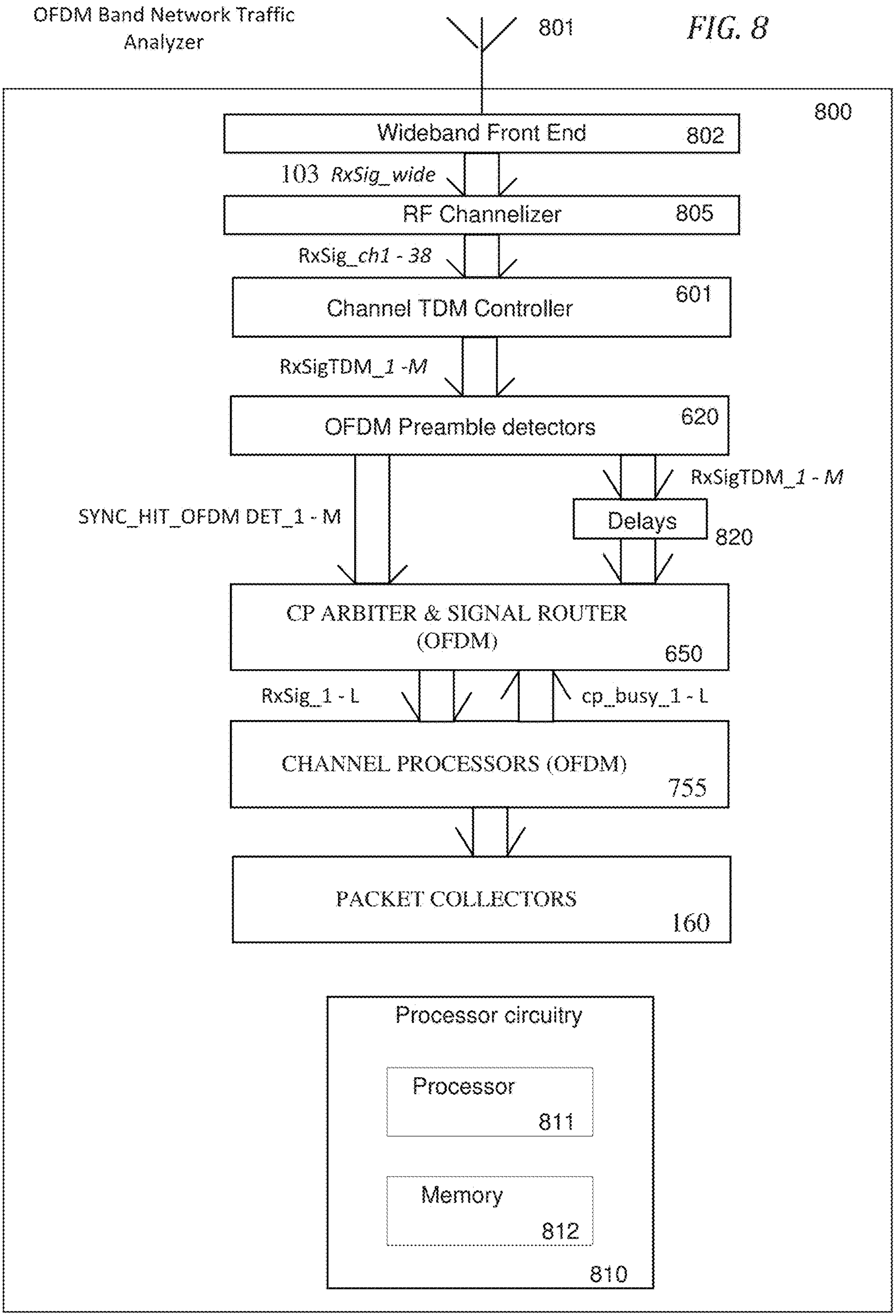
FIG. 8 is a block diagram of an example of a network traffic analyzer that may be used to monitor signals using an OFDM preamble across the entire 2.4 and 5 GHz bands.

FIG. 8 is a block diagram of an example of a network traffic analyzer 800 that may be used to monitor signals using an OFDM preamble across the entire 2.4 and 5 GHz bands. In some embodiments the network traffic analyzer 800 includes an antenna 801, a wideband front end 802, an RF channelizer 805, Channel TDM Controller 601, OFDM Preamble Detectors 620, delays 820, CP Arbiter & Signal Router (OFDM) 755, Channel Processors (OFDM) 755, Packet Collectors 160 and processing circuitry 810.

The wideband front end 802 may perform the usual functions of an RF front end such as low noise amplification, filtering, and I/Q frequency down conversion so as to condition the received signal for inputting to the RF channelizer 805. The RF channelizer 805 may perform the function of filtering the wideband received signal into discrete channels. For example, if the wideband front end 802 detects signals across the 2.4 and 5 GHz band there may be 38 Wi-Fi channels (channels 1 to 14 and 32 to 144, omitting the U-NII-2B bank). The individual 38 channel I/Q data streams, e.g., RxSig_ch_1 110, RxSig_ch_2 111, RxSig_ch_N 115, may be inputted to Channel TDM Controller 601. As discussed above with reference to FIG. 6, Channel TDM Controller 601 may provide signals on a subset of the 38 channels to bank of OFDM Preamble Detectors 620 and also to the bank of OFDM Preamble Detectors 620. For example, as discussed above with reference to FIG. 6, the bank of OFDM Preamble Detectors 620 may comprise, say, 13 OFDM Preamble Detectors, e.g., 621, 622, 625 and every 0.25 seconds a subset of 13 channels of the 38 available channels may be monitored by the 13 preamble detectors in the bank of OFDM Preamble Detectors 620. The 13 selected individual channel I/Q data streams, e.g., RxSigTDM_1 611, RxSigTDM_2 612, RxSigTDM_M 615, may be input, via a bank of delays 820, to CP Arbiter & Signal Router (OFDM) 650. The bank of delays 820 may include 13 delays as depicted in FIG. 6, e.g., 631, 632, 635. The 13 individual channel I/Q data streams, e.g., RxSigTDM_1 611, RxSigTDM_2 612, RxSigTDM_M 615, may be input to the bank of OFDM Preamble Detectors 620, and, as discussed above with reference to FIG. 6, if an OFDM preamble is detected, then a SYNC_HIT_OFDM_DET signal, e.g., 641, 642, 635, may be sent to CP Arbiter & Signal Router (OFDM) 650. The CP Arbiter & Signal Router (OFDM) 650 then may examine the cp_busy inputs from the Channel Processors (OFDM) 755 and if a CP is available then the detected signal RxSig, may be input to that available CP. The bank of Channel Processors (OFDM) 755 may perform the functions of I/Q demodulation, guard interval removal, FFT (fast Fourier transform), pilot removal, de-interleaving, de-mapping, decoding, and descrambling and demodulating such that the signals are suitable for inputting to the Packet Collectors 160 where the individually received packets are stored.

The functions of the wideband front end 802, an RF channelizer 805, Channel TDM Controller 601, OFDM Preamble Detectors 620, delays 820, CP Arbiter & Signal Router (OFDM) 755, Channel Processors (OFDM) 755, Packet Collectors 160 may be performed by one or more processors and/or processor cores and/or FPGAs. In some embodiments the wideband front end 802, an RF channelizer 805, Channel TDM Controller 601, OFDM Preamble Detectors 620, delays 820, CP Arbiter & Signal Router (OFDM) 755, Channel Processors (OFDM) 755, Packet Collectors 160 and/or the processing circuitry 810 may comprise a processor 811, integrated circuitry for processing and/or control, e.g., one or more processors and/or processor cores and/or FPGAs (Field Programmable Gate Array) and/or ASICs (Application Specific Integrated Circuitry) configured to execute programmatic software instructions. In some embodiments some or all of the functions of the wideband front end 802, an RF channelizer 805, Channel TDM Controller 601, OFDM Preamble Detectors 620, delays 820, CP Arbiter & Signal Router (OFDM) 755, Channel Processors (OFDM) 755, Packet Collectors 160, may be performed by the processing circuitry 810. The processing circuitry 810 may be configured to control any of the methods and/or processes described herein and/or to cause such methods, and/or processes to be performed. The memory module 812 is configured to store data, programmatic software code and/or other information described herein. In some embodiments, the software may include instructions that, when executed by the processing circuitry 810, causes the processing circuitry 810 to perform the processes described herein with respect to the network traffic analyzer 800.

In other words, Network traffic analyzer 800 may continuously monitor the 38 channels across the 2.4 and 5 GHz bands detecting OFDM preambles on any of the 38 channels. Channel TDM Controller 601 routes, on a scheduled basis, a subset, M, of the 38 channels to a bank of OFDM Preamble detectors 620 that comprises M OFDM preamble detectors. CP Arbiter & Signal Router (OFDM) 650 routes detected signals with OFDM preamble to a bank of L3 channel processors. Channel Processors (DSSS) 755, that demodulate the signals into received packets that may be stored in packet collectors 160.

In order to estimate the number L3 of channel processors required in Channel Processors (DSSS) 750, the following traffic model analysis is made.

Traffic model parameters:

| | |
|---|---|
| Number of Clause 17 Wi-Fi stations | 32 |
| Number of channels | 38 |
| Number of trials | 25 |

The following parameters are randomly selected:

| | |
|---|---|
| Channel selection | 1-38 |
| Data Rate | 6-54 Mbps |
| Payload | 4 to 384 octets |
| Packet time of arrival | .00454 to 7.680 ms |
| Simulation trial duration variation | 7.47 to 8.53 ms |

The following configurations are considered and analyzed:

D. 38 dedicated CPs no SSR or Channel TDM

E. 13 CPs (L3=13) with Channel TDM (M=13)

F. 13 CPs (L3=13) with SSR and no Channel TDM

G. 13 CPs (L3=13) with SSR and Channel TDM (M=19)

The result of the analysis in terms of the number of detected packets, number of false packets, and number of successful, error-free packets, for each configuration is given in Table 3.

TABLE 3

| Traffic analysis (OFDM) | | | |
|---|---|---|---|
| Configuration | # detected packets | # false packets | # successful packets |
| D 38 channels no SSR, no TDM | 529 | 0 | 436 |
| E L3 = 13, TDM (M = 13) | 172 | 0 | 141 |
| F L3 = 13, SSR no TDM | 529 | 0 | 436 |
| G L3 = 13, SSR TDM (M = 19) | 247 | 0 | 204 |

The average duty cycles of the CPs used in configurations B and C, are given in Table 4.

TABLE 4

| Average Duty Cycle per CP | | | | | |
|---|---|---|---|---|---|
| Configuration | CP 1 | CP2 | CP3 | . . . | CP13 |
| F L3 = 13, SSR no TDM | 0.2576 | 0.0132 | 0 | . . . | 0 |
| G L3 = 13, SSR TDM (M = 19) | 0.1219 | 0.0039 | 0 | . . . | 0 |

From Table 3, Configuration F, the SSR scheme having 13 CPs and 38 dedicated Preamble Detectors, captures the same number of packets as Configuration A which has 38 dedicated CPs. Furthermore, from Table 4, under these conditions, for SSR, only the first two CPs are ever used which indicates the flexibility of SSR. The number of CPs required is strictly a function of how busy the expected traffic is. Configuration E has three phases of the Channel TDM, i.e., three phases of 13 channels are required to cover the 38 channels, whereas Configuration G has just 2 phases. From Table 3, the number of detected packets, 172, for Configuration E is approximately one third of the detected packets, 529, for Configuration D (38 CPs). Also from Table 3, the number of detected packets, 247, for Configuration G is approximately one half of the detected packets, 529, for Configuration D (38 CPs). Hence, the effect of Channel TDM is to reduce the number of detected packets in proportion to the number of TDM phases. TDM is therefore only used when there is a restriction on the hardware or processing capability, with the acceptance that the number of detected packets will be inversely proportional to the number of TDM phases. Based upon this example traffic analysis, the number of channel processors in the bank of Channel Processors (OFDM) 755 could be just 2, i.e., L3=2. Channel TDM Controller 601 may be omitted but in this case 38 individual OFDM preamble detectors would be required in the bank of OFDM Preamble Detectors 620. An OFDM preamble detector may require significant hardware and as such, dependent upon the overall hardware and processing capability e.g., size and cost of an FPGA, a compromise between the number of OFDM preamble detectors and use of a Channel TDM controller 601, and/or the number of channels in the TDM channel subset, may be made. In other words, the inclusion of the Channel TDM controller 601 does reduce the number of detected packets in inverse proportion to the number of phases used in the Channel TDM Controller 601. Hence, ideally, referring again to FIG. 8, the Channel TDM Controller 601 may be omitted but the bank of OFDM Preamble detectors 620 must then comprise 38 individual preamble detectors.

Figure 9:
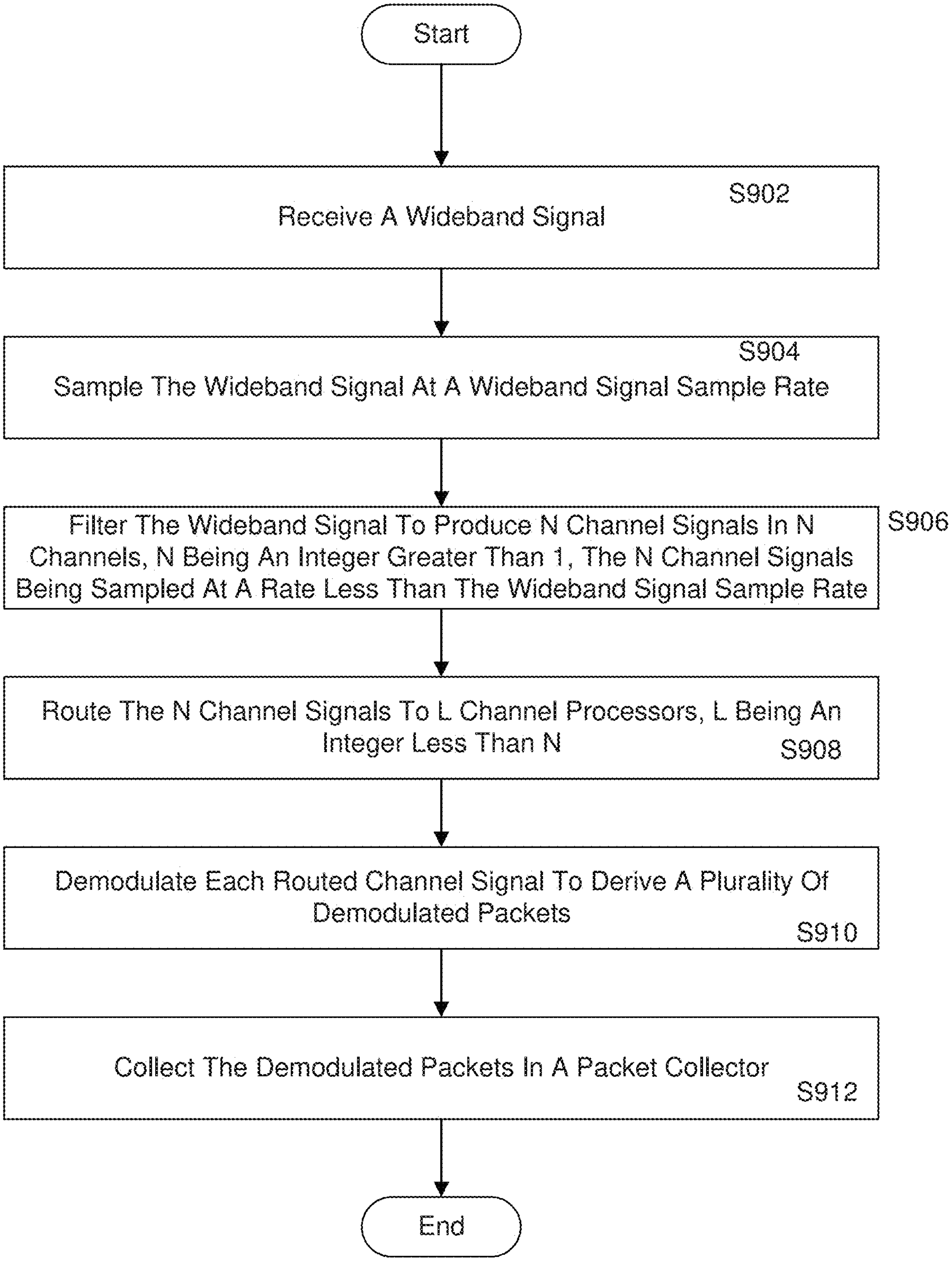
FIG. 9 is a flowchart of an example process for smart signal routing according to principles disclosed herein.

FIG. 9 is a flowchart of an example process for detection of wireless communication network packets corresponding to a desired waveform type across a wideband. The process may be performed by one or more of a receiver that includes wideband front end 102, a filter bank such as a filter bank of channelizer 105, a router such as SSR 120, L channel processors such as channel processors 750, and a collector such as packet collectors 160. The process includes receiving a wideband signal (S902). The process also includes sampling the wideband signal at a wideband signal sample rate (S904). The process further includes filtering the wideband signal to produce N channel signals in N channels, N being an integer greater than 1, the N channel signals being sampled at a rate less than the wideband signal sample rate (S906). The process includes routing the N channel signals to L channel processors, L being an integer less than N (S908). The process also includes demodulating each routed channel signal in a channel processor of the L channel processors to derive a plurality of demodulated packets (S910). The process further includes collecting the demodulated packets in a packet collector (S912).

In some embodiments, the routing is performed by: detecting a signal preamble in one of the N channel signals; and routing the detected signal preamble to an available channel processor of the L channel processors via a delay such that the available channel processor receives a complete signal. In some embodiments, the N channel signals are direct sequence spread spectrum (DSSS) signals across a 2.4 GHz band. In some embodiments, for each of the N channels, the routing detects short direct sequence spread spectrum (DSSS) preamble and long DSSS preamble of the channel signal and estimates a moving energy over an energy estimation window. In some embodiments, the method includes applying discarding false DSSS preamble detections from neighboring channels, and upon detection of a DSSS preamble on one or more channels: opening a short evaluation window of pre-determined length; and selecting the channel with a highest moving energy coinciding with a preamble synchronization from a corresponding binary preamble detector. In some embodiments, the method includes discarding packets when both short and long DSSS preambles have been detected within a short, pre-determined time interval on a same channel of the N channels. In some embodiments, the channel signals are orthogonal frequency division multiplex (OFDM) signals across 2.4 GHz and 5 GHz bands. In some embodiments, a number of OFDM preamble detectors are shared among the N channels via time division multiplexing (TDM). In some embodiments, the method includes advancing a TDM phase at successive intervals to provide a different subset of the N channels to the number of OFDM preamble detectors. In some embodiments, L is based at least in part on a number of time division multiplex (TDM) phases of operation of a channel controller configured to perform the routing.

Note that the modules discussed herein may be implemented in hardware or a combination of hardware and software. For example, the modules may be implemented by a processor executing software instructions or by application specific integrated circuitry configured to implement the functions attributable to the modules. Also note that the term “connected to” as used herein refers to “being in communication with” and is not intended to mean a physical connection nor a direct connection. It is contemplated that the signal path between one element and another may traverse multiple physical devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that may direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

While the above description contains many specifics, these should not be construed as limitations on the scope, but rather as an exemplification of several embodiments thereof. Many other variants are possible including, for examples: the number of channels out of the channelizer, the number of channel processors, the details of the DSSS preamble detectors, the details of the OFDM preamble detectors, the lengths of the delays, the number of phases of the channel TDM controller, the omission of the channel TDM controller, the details of the signal routing. Accordingly, the scope should be determined not by the embodiments illustrated, but by the claims and embodiments.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method for detection of wireless communication network packets corresponding to a desired waveform type across a wideband, the method comprising:

receiving a wideband signal;

sampling the wideband signal at a wideband signal sample rate;

filtering the wideband signal to produce N channel signals in N channels, N being an integer greater than 1, the N channel signals being sampled at a rate less than the wideband signal sample rate;

routing the N channel signals to L channel processors, L being an integer less than N, wherein the routing comprises:

detecting a signal preamble in one of the N channel signals; and routing the detected signal preamble to an available channel processor of the L channel processors via a delay such that the available channel processor receives a complete signal;

demodulating, via the L channel processors, each routed channel signal to derive a plurality of demodulated packets; and collecting the demodulated packets in a packet collector.

2. The method of claim 1, wherein the N channel signals are direct sequence spread spectrum (DSSS) signals across a 2.4 GHz band.

3. The method of claim 2, further comprising, for each of the N channels, the routing detects short direct sequence spread spectrum (DSSS) preamble and long DSSS preamble of the channel signal and estimates a moving energy over an energy estimation window.

4. The method of claim 3, further comprising discarding false DSSS preamble detections from neighboring channels, and upon detection of a DSSS preamble on one or more channels:

opening a short evaluation window of pre-determined length; and selecting the channel with a highest moving energy coinciding with a preamble synchronization from a corresponding binary preamble detector.

5. The method of claim 4, further comprising discarding packets when both short and long DSSS preambles have been detected within a short, pre-determined time interval on a same channel of the N channels.

6. The method of claim 1, wherein the channel signals are orthogonal frequency division multiplex (OFDM) signals across 2.4 GHz and 5 GHz bands.

7. The method of claim 6, wherein a number of OFDM preamble detectors are shared among the N channels via time division multiplexing (TDM).

8. The method of claim 7, further comprising advancing a TDM phase at successive intervals to provide a different subset of the N channels to the number of OFDM preamble detectors.

9. The method of claim 1, wherein L is based at least in part on a number of time division multiplex (TDM) phases of operation of a channel controller configured to perform the routing.

10. A communication network traffic analyzer for detection of wireless communication network packets corresponding to a desired waveform type across a wideband, the analyzer comprising:

a receiver configured to:
receive a wideband signal;
sample the wideband signal at a wideband signal sample rate;
a filter bank configured to filter the wideband signal to produce N channel signals in N channels, N being an integer greater than 1, the N channel signals being sampled at a rate less than the wideband signal sample rate;
a router configured to route the N channel signals to L channel processors, L being an integer less than N, wherein routing the N channel signals comprises:
detecting a signal preamble in one of the N channel signals; and
routing the detected signal preamble to an available channel processor of the L channel processors via a delay such that the available channel processor receives a complete signal,
wherein the L channel processors are configured to demodulate each routed channel signal to derive a plurality of demodulated packets; and
a collector configured to collect the demodulated packets in a packet collector.

11. The analyzer of claim 10, wherein the N channel signals are direct sequence spread spectrum (DSSS) signals across a 2.4 GHz band.

12. The analyzer of claim 11, further comprising, for each of the N channels, a binary preamble detector to: detect a short direct sequence spread spectrum (DSSS) preamble and a long DSSS preamble of the channel signal; and estimate a moving energy over an energy estimation window.

13. The analyzer of claim 12, further comprising a Neighbor Channel Filter (NFC) configured to discard false DSSS preamble detections from neighboring channels, wherein the NFC, on detection of a DSSS preamble on one or more channels is configured to:
open a short evaluation window of pre-determined length; and
select the channel with a highest moving energy coinciding with a preamble synchronization from a corresponding binary preamble detector.

14. The analyzer of claim 13, further comprising a Duplicate Channel Filter configured to discard packets when both short and long DSSS preambles have been detected within a short, pre-determined time interval on a same channel of the N channels.

15. The analyzer of claim 10, wherein the channel signals are orthogonal frequency division multiplex (OFDM) signals across 2.4 GHz and 5 GHz bands.

16. The analyzer of claim 15, wherein a number of OFDM preamble detectors are shared among the N channels via time division multiplexing (TDM).

17. The analyzer of claim 16, further comprising a Channel TDM Controller configured to advance a TDM phase at successive intervals to provide a different subset of the N channels to the number of OFDM preamble detectors.

18. The analyzer of claim 10, wherein L is based at least in part on a number of time division multiplex (TDM) phases of operation of a channel controller configured to perform the routing.

* * * * *